United States Patent [19]

Samanta

[11] 4,286,905

[45] Sep. 1, 1981

[54] METHOD OF MACHINING STEEL, MALLEABLE OR NODULAR CAST IRON

[75] Inventor: Shyam K. Samanta, Ypsilanti, Mich.

[73] Assignee: Ford Motor Company, Dearborn, Mich.

[21] Appl. No.: 145,164

[22] Filed: Apr. 30, 1980

[51] Int. Cl.³ .................. B23C 1/00; C04B 35/10; C04B 35/58

[52] U.S. Cl. .................. 409/132; 51/309; 82/1 C; 106/73.2; 106/73.4; 407/119; 408/1 R;; 29/557

[58] Field of Search ............ 409/131, 132; 408/1 R; 82/1 C; 407/119; 51/309; 106/73.2, 73.4; 29/557

[56] References Cited

U.S. PATENT DOCUMENTS

| | | | |
|---|---|---|---|
| 3,903,230 | 9/1975 | Kamigaito et al. | 106/73.4 |
| 3,960,581 | 6/1976 | Cutler | 106/73.4 |
| 3,969,125 | 7/1976 | Koweya et al. | 106/73.2 |
| 3,991,166 | 11/1976 | Jack et al. | 106/73.4 |
| 4,066,468 | 1/1978 | Kamigaito et al. | 106/73.4 |
| 4,113,503 | 9/1978 | Lumby et al. | 106/73.4 |
| 4,127,416 | 11/1978 | Lumby et al. | 106/73.2 |
| 4,147,759 | 4/1979 | Demit | 106/73.4 |
| 4,227,842 | 10/1980 | Samanta et al. | 106/73.2 |

*Primary Examiner*—O. R. Vertiz
*Assistant Examiner*—Mark Bell
*Attorney, Agent, or Firm*—Joseph W. Malleck; Olin B. Johnson

[57] ABSTRACT

A method is disclosed for removing stock from a metal part comprised of steel, malleable cast iron or nodular cast iron. A moving relationship is established between the part and a cutting tool formed of a substantially full dense hot pressed ceramic material consisting essentially of a generally uniform mixture of 50-70% by weight $Al_2O_3$ and the remainder substantially $Si_3N_4$. The tool is advanced into the surface of the part at a predetermined depth of cut and feed rate which results in the removal of stock from the part during periods of relative movement. A portion of the $Al_2O_3$ may be replaced by up to 15% stabilized $ZrO_2$ or $HfO_2$ to further improve strength at higher temperatures.

4 Claims, No Drawings

METHOD OF MACHINING STEEL, MALLEABLE OR NODULAR CAST IRON

BACKGROUND OF THE INVENTION

In the continuing research for better methods of machining metals with lower costs, particularly by use of ceramics, there has been some lack of understanding of the interdependence of thermal, physical and mechanical properties of materials needed to machine a specific metal.

Ceramic materials used to date as tool bits for cutting by the prior art have fallen into two classes: (a) $Al_2O_3$ based ceramics that contain 10-20% of a densifying agent such as TiN, $TiO_2$, CaO, MgO or $Cr_2O_3$, and (b) $Si_3N_4$ based ceramics that contain a minor amount (2-20%) of a densifying agent such as MgO or $Y_2O_3$. Almost all of today's available commercial ceramic cutting tools are of the class (a) type. $Al_2O_3$ based commercial cutting tools vary widely in their tool life and fail by thermal cracking or chipping attributed to inherent brittleness. The quick cure by the prior art to extend tool life has been to concentrate on physical or mechanical properties by making more rigid the holding of the tool while machining, eliminating vibrations in the machining setup, and by improving tool geometry. The poor thermal shock resistance of $Al_2O_3$ based ceramics was ignored. Despite a variable tool life, $Al_2O_3$ based ceramics have shown excellent chemical stability and thereby superior resistance to cratering resulting from chemical reactivity with the hot chip being removed.

Certain $Si_3N_4$ based ceramics possess sufficient thermal shock resistance to dramatically improve tool life when machining metals that do not present a chemical reactivity problem, such as grey cast iron. However, when used to machine steel or nodular iron, the $Si_3N_4$ based material exhibit poor resistance to wear or surface abrasion at elevated temperatures such as 1000°-1200° C. and exhibit poor resistance to oxidation. The tool material wears out readily as evidenced by severe crater wear. Similar cratering or wear patterns are experienced on machining steel or nodular iron, regardless of the densifying additives employed. This suggests that such poor wear resistance when cutting steel or nodular iron is an inherent defect of $Si_3N_4$. It is believed that the existence of an extremely hot stringer or chip of stock metal, which is unsevered but shear cut by the tool, comes back into contact with the tool bit surface creating the cratering wear. In machining grey cast iron, there is very little extended chip formation that can come back or remain in contact with the tool so the circumstance for promoting cratering is avoided.

What is needed is an improved method of machining steel, nodular cast iron, or malleable cast iron, which metals each present a chemical reactivity problem. The method should utilize a ceramic material that is chemically stable, has a high thermal shock factor, and is reasonably strong at elevated tool bit temperatures.

SUMMARY OF THE INVENTION

The invention is a method of removing stock from a metal part comprised of steel, malleable cast iron or nodular cast iron. In the machining of such metal parts, a continuous chip is generated by the shear deformation of the metal. The hot chip is not easily broken and continues to slide on the cutting tool surface. While deploying a cutting tool formed of a substantially fully dense hot pressed ceramic material consisting essentially of a generally uniform mixture of 50-70% by weight $Al_2O_3$ and the remainder $Si_3N_4$, a relative motion is established between the tool and the workpiece similar to those obtained in milling, turning and boring operations. The tool is then advanced into the surface of the part at a predetermined depth of cut and feed rate which results in the removal of stock from the part during periods of the relative movement. In this method it is preferred that the removal of stock take place at relatively high speeds (1000-6000 sfm) and that the mass removal rate of metal be characterized by a depth of cut of 0.04-0.20 inches and a feed rate of 0.004-0.02 inches per revolution. The prolonged life of the tool in this method is particularly evident when machining for at least ten minutes. The tool will experience no indication of thermal cracking and wear on the cutting face will be limited to less than 0.025 inches.

It has also been proposed that it could be advantageous to replace an equivalent portion of $Al_2O_3$ in the tool with up to 15% of either $ZrO_2$, $HfO_2$ or $Y_2O_3$.

DETAILED DESCRIPTION

Before carrying out an illustrative mode in accordance with this invention of continuous or interrupted machine cutting of solid steel, malleable cast iron or nodular cast iron stock by milling, turning or boring, the tool must be constituted of a particular mixture of $Al_2O_3$ and $Si_3N_4$. The ceramic cutting tool is preferably prepared by mixing $Al_2O_3$ and $Si_3N_4$ powders (the $Al_2O_3$ powder constituting 50-70% by weight of the mixture) and then hot pressing the mixture at a sufficient pressure and temperature for a period of time to achieve substantially full density.

The $Al_2O_3$ $Si_3N_4$ powders are selected to have a chemical content containing less than one percent cation impurities, the most frequently occurring impurities being Ca, Fe, Al and $O_2$. Individually, it is preferred that the elements be limited as follows: less than 0.5% Fe, less than 0.01% Ca, less than 0.4% Al, and less than 2.0% $O_2$. The preferred average particle size diameter for the alumina powder is about 1-2 microns. The $Si_3N_4$ powder should advantageously have at least 85% alpha phase $Si_3N_4$, which is converted to the beta phase during heating and hot pressing. The selected average particle size diameter for the $Si_3N_4$ powder is preferably 2.0-2.5 microns. The amount of $Al_2O_3$ powder needed for a specific application is measured and weighed, the amount being in the range of 50-70% by weight of the intended mixture, and preferably 65-70% when the only other additive is $Si_3N_4$. The $Si_3N_4$ powder is also measured and weighed to provide the remainder of the mixture, preferably being 30-35%. The two measured powder quantities are placed together in a milling device and milled for a period of time to provide uniform blending and an average particle diameter of about 1.0-1.4 microns.

For carrying out hot pressing, it is preferable to use an assembly having a die body, a base, a sleeve punch unit and a susceptor, all constituted of graphite. The graphite forms an inert environment about the powder mixture during pressing and thus a flowing, gaseous, protective atmosphere (such as $N_2$) is not mandatory but desirable. Prior to pressing, the graphite die parts are coated with a BN film to a thickness of about 0.002 inches. The pressing sequence is initiated by applying a nominal pressure of about 400-600 psi to the mixture which has been placed in the assembly. After the powder charge has been suitably precompacted, the pressure is increased to the desired level of about 500 psi (operably between 3800-6500 psi) and heating is initiated. The pressurized powder is heated to the range of 1500°-1600° C. for a period of time (typically less than 30 minutes) to achieve full density. During this heating and pressing sequence, alpha phase silicon nitride is converted to beta phase silicon nitride.

When full density is achieved, the pressure and heat is shut off and the pressed body is preferably cooled to room temperature at a rate of about 100° C./min. The resultant hot pressed body is then shaped as a cutting tool with desired cutting surfaces according to standardized configurations in the industry. The shaped tool will be a mixture, not a single phase, of the added ingredients. It will be a marriage of separate ingredients that retain their physical identities and thereby contribute their separate physical properties. The shaped tool bit will exhibit a combination of at least two principal physical characteristics, a thermal shock resistance which is much higher than commercial $Al_2O_3$ based ceramics and chemical inertness which is similar to commerical $Al_2O_3$ based ceramics. This unique combination enables the resulting material to be used as a cutting tool material on steel nodular cast iron and malleable cast iron at relatively high speeds. The material retains a high modulus of rupture strength at high temperatures, typically at least 45,000 psi at 1200° C. The density of the hot pressed ceramic will be about 3.54 grams/cm$^3$ and the hardness will be about 90 Rockwell 45-N.

A preferred method for carrying out the invention is as follows:

(1) While deploying a cutting tool formed of a substantially fully dense hot pressed ceramic material consisting essentially of a generally uniform mixture of 50-70% by weight $Al_2O_3$ and the remainder $Si_3N_4$, establishing a relative motion between the tool and a metal part comprised of steel, malleable cast iron or nodular cast iron. This relative motion is similar to those obtained in turning, milling or boring operations. Typically, the rotation is sufficiently fast to provide a relative speed of 1000-6000 sfm.

(2) The tool is then advanced into the surface of the part at a predetermined depth of cut and feed rate which results in the removal of stock from the part during periods of the relative movement. It is preferred to carry out such advancement with a depth of cut in the rangae of 0.04-0.02 inches and a feed rate of 0.004-0.02 inches/revolution.

Test Samples 14 samples were prepared in accordance with the method described above; a 70-30% ratio of $Al_2O_3$/-$Si_3N_4$ was employed. The ultimate pressing pressure was 5000 psi and the hot pressing temperature was 1600° C. Some of the samples were employed in the machine cutting of ASA 1045 and 1018 steel under different types of machining modes and other samples were used to machine nodular and malleable cast iron in a turning operation.

The machine cutting conditions and performance data are listed in Table 1, along with comparative performance data on these metals for a commercial hot pressed ceramic $Al_2O_3$ based cutting tool (with 10-20% TiC), $Si_3N_4$ based tool (2-8% $Y_2O_3$ or MgO), and a $Si_3N_4$ based tool containing a minor amount of $Al_2O_3$. In addition, performance data for a $Si_3N_4$ based tool used to machine grey cast iron and for a $Al_2O_3$ based commercial tool used to machine aluminum and grey cast iron.

The normal accepted standard for commercial tools for machining steel is that the tool must be able to machine at 800-900 sfm for a period of ten minutes with no greater than 0.025 inches of wear and no thermal cracking. As soon as thermal cracking appears, catastrophic failure is imminent, even if wear is not excessive. It should be noted in Table 1 that Sample 3 was run for a period of 9.5 minutes at a surface cutting speed of 1000 sfm and wear experienced was 0.0137 inches with no thermal cracking. This is about one-half the normal wear experienced with commercial cutting tools having an $Al_2O_3$ base. Similar conditions and results were recorded for Samples 4 and 5.

For Sample 11, the tool was used for milling 1018 steel for a period of seven minutes at a cutting speed of 1000 sfm. The indicated wear was 0.002 inches, about one-tenth the expected wear with a commercial $Al_2O_3$ based cutting tool. With respect to Samples 13 and 14, each was run for 11 minutes at a cutting speed of 1000 sfm, the indicated wear was 0.005 inches, which is about one-fifth the expected wear with commercial cutting tools.

The actual measured difference in wear between a commercial $Al_2O_3$ based cutting tool and a specific sample of this invention is recorded for Samples 1, 9 and 10. The difference in wear between the cutting tools used under identical cutting conditions shows that the commercial tools experienced failure by thermal cracking, chipping or fracture at or before the time during which the sample tool of this invention when used for machining 1045 steel. There was no observed thermal cracking, chipping or fracture failure with the tool manufactured in accordance with the present invention.

Qualitatively, the machining wear of the tool bits used in accordance with the present invention appears to be entirely of an abrasive nature. This may originate as a weakness at the interface between the $Al_2O_3$ and the $Si_3N_4$ grains, resulting in microerosion at the grain boundaries and removal of the primary grain through abrasion. As an alternative modification to the present invention, it is proposed that machining be carrried out with a tool material that has the bonding interface between $Si_3N_4$ and $Al_2O_3$ modified by the presence of an oxide selected from the group consisting of stabilized $ZrO_2$ or $HfO_2$, each of which should improve the wear resistance of the resulting ceramic. It is suggested that the powder mixture for hot pressing should preferably consist of 55% $Al_2O_3$, 30% $Si_3N_4$, and up to 15% $ZrO_2$ which has been stabilized. It is believed that the introduction of stabilized zirconia in the matrix of the resulting ceramic will also improve the strength of the material at higher temperatures.

TABLE 1

| Sample | Material Machined | Machining Operation | Cutting Cond. Speed (SFM) | Feed (IPR) | DOC (IN.) | 70% Al₂O₃/30% Si₃N₄ Material Cutting Time (Minutes) | (IN.) | Remarks | Commercial Ceramic Performance Cutting Time (Minutes) | Wear (IN.) | Remarks |
|---|---|---|---|---|---|---|---|---|---|---|---|
| 1 | 1045 Steel | Turning | 500 | .0102 | .040 | 10.0 | .0024 | No Thermal Cracking | 10.0 | .004 | Thermal Cracking |
| 2 | " | " | 500 | .0111 | .200 | 16.5 | .008 | No Thermal Cracking | | | |
| 3 | " | " | 1000 | .011 | .100 | 9.5 | .0137 | No Thermal Cracking | | | |
| 4 | " | " | 1000 | .011 | .100 | 10.9 | .0165 | No Thermal Cracking | | | |
| 5 | " | " | 1000 | .022 | .040 | 11.4 | .0174 | No Thermal Cracking | | | |
| 6 | " | " | 2000 | .005 | .040 | 16.5 | .031 | No Thermal Cracking | | | |
| 7 | " | " | 2000 | .011 | .040 | 16.4 | .0305 | No Thermal Cracking | | | |
| 8 | " | " | 2000 | .011 | .100 | 16.3 | .025 | No Thermal Cracking | | | |
| 9 | 1045 Steel | Milling | 6000 | .0036 | .100 | 2.2 | .014 | No Thermal Cracking | 2.0 | .008 | Chipping Along Cutting Edge |
| 10 | " | " | 2170 | .0036 | .100 | 12.6 | .020 | No Thermal Cracking | 6.0 / 7.3 | .0034 / — | Thermal Cracking / Nose Fractured |
| 11 | 1018 Steel | Milling | 1000 | .010 | .040 | 7.0 | .002 | No Thermal Cracking | | | |
| 12 | " | " | 1000 | .020 | .040 | 3.5 | <.001 | No Thermal Cracking | | | |
| 13 | Nodular Cast Iron | Turning | 1000 | .004 | .040 | 11 | .005 | No Thermal Cracking | | | |
| 14 | Malleable Cast Iron | Turning | 1000 | .004 | .040 | 11 | .005 | No Thermal Cracking | | | |

I claim:

1. A method of removing stock from a metal part comprised of steel, malleable cast iron or nodular cast iron, comprising:
   (a) establishing a relative motion between said part and a cutting tool formed of a substantially fully dense hot pressed ceramic material consisting essentially of a generally uniform mixture of 50–70% by weight Al₂O₃ and the remainder substantially Si₃N₄;
   (b) advancing said tool into the surface of said part at a predetermined depth of cut and feed rate which results in the removal of stock from the part during periods of said relative movement.

2. A method of removing stock from a solid steel, malleable cast iron or nodular cast iron part, comprising the steps of:
   (a) establishing a revolving relationship between said part and a cutting tool formed of a substantially fully dense hot pressed ceramic material consisting essentially of a generally uniform mixture of 50–70% Al₂O₃ and the remainder Si₃N₄, the rate of movement of said revolving relationship being in the range of 1000–6000 sfm; and
   (b) advancing said tool into the surface of the part to establish a depth of cut and a feed rate which results in the removal of stock from the part during periods of said relative movement between the tool and part, said depth of cut being in the range of 0.04–0.20 inches and said feed rate being in the range of 0.004–0.02 inches/revolution.

3. The method as in claim 2, in which said stock removal is carried out for a period of at least ten minutes with said tool experiencing no indication of thermal cracking and wear is limited to less than 0.025 inches.

4. The method as in claim 1, in which said cutting tool is comprised of ceramic material having an equivalent portion of Al₂O₃ replaced by up to 15% of stabilized ZrO₂ or HfO₂.

* * * * *